Patented Feb. 26, 1952

2,587,125

UNITED STATES PATENT OFFICE 2,587,125

ORGANIC FERTILIZER

Mary Aloyse Ellingson, Kansas City, Mo.

No Drawing. Application December 22, 1947,
Serial No. 793,333

9 Claims. (Cl. 71—2.5)

This invention relates to improvements in organic fertilizers and has particular reference to a natural, organic source of a complete plant invigorator.

The principal object of the present invention is the provision of a cheap, efficient, long lasting supply of plant stimulators having the materials needed for luxuriant plant growth and plant maturing.

Another object of this invention is the provision of an active composition that can be marketed as a liquid, a solid or in bags of mixed treated compost.

A primary object of this invention is the provision of a stimulant which can be applied in the form of a spray thus making the invigorating substances immediately available to the plant tissues of leaf, bud, and fruit, and using the active stimulants at extremely dilute solutions.

A further object of this invention is the provision of a substance which will invigorate cut flowers and enhance their beauty, fragrance, and strength.

A further object is the provision of an organic fertilizer that will substitute for heavier animal matter in compost heaps, and which will quickly activate and speed the disintegration process.

Other objects are the production of a fertilizer that will generally invigorate all the plant tissue and augment general plant physiological functions; will give rapid growth, with strong tissues; will give early strength to seedlings and transplants; and will produce increased and prolonged flowering.

A further object is the production of a stimulant which lends itself to useful combinations with other plant aids such as root-inducing substances, certain insecticides and fungicides, certain antibiotic organic extracts and thus reduces time and labor elements and gives effective results.

With these objects in view, reference will be had to the composition and the method of making the same.

This invention contemplates the production of composition of plant invigorating matter, quickly and cheaply, through the biological activity of yeast on bone tissue in an aqueous medium maintained at an optimum pH of substantially 5.0.

Any variety and condition of bone tissue, preferably without fat, may be used as the substratum; however, a small seeding of bone marrow stock is to be desired. The bone tissue is disintegrated by the micro-organisms at the same time that it is being used as a source of their nutrients. Thus the organic and inorganic constituents of the bone tissue are freed into the liquid medium, together with the metabolic products of the living and dead organisms, and become available stimulants for plant growth.

In the production of this composition, applicant has used the so-called industrial or technical yeasts known commercially as brewers yeast.

The ground bone tissue or bone meal is dispersed in water, and the resulting aqueous substrate is maintained at an optimum pH5 by the addition of a small amount of a water soluble inorganic or organic acid, which is compatible with the life of the particular fungus being used, to establish and maintain the desired low pH optimum, for example, sulphuric, phosphoric, acetic, tartaric, citric, etc. Of these acids acetic has proven very satisfactory. Ordinary cider vinegar has been used; about 50 grams of the vinegar in 4000 grams of water.

The following formula is a general one that has proven very efficient in numerous tests over a period of more than two years.

| | Grams |
|---|---|
| Industrial yeast | 15 |
| Bone tissue | 150 |
| Cider vinegar | 50 |
| Water | 4000 |

This mixture is allowed to stand for a few days. At this time-period the supernatant liquid will give positive tests for phosphorus, nitrogen, and potassium, in varying amounts, and will give tests similar to those of auxin, etc. The amount of the stimulatory substances liberated, in water-soluble form, from the bone tissue, and including the products of metabolism of the yeast, increases with time to a maximum and this holds over a considerable period. The volume of the ferment batch is kept constant by suitable additions of make-up water and vinegar. The water-soluble products of the metabolism of the yeast, using bone tissue as its nutrient medium or substrate, are taken up in the water of the batch, to form a supernatant nutrient liquid. For use the supernatant liquid is diluted to varying strengths for particular plant needs, and for use as a watering agent, spray, or activator. These dilutions take on the range of hormone, vitamin, and enzyme potency. This composition can be conveniently handled as a condensed liquid; as tablets or other compressed form; in bags of treated compost or leafmold.

In actual tests of the above formula the presence of phosphorus in the liquid was positive within one week's period. Make-up water was added from time to time, make-up cider vinegar was added to keep the pH low, and make-up bone was added once during two seasons for a garden-plat of 70 x 100 feet. At the end of the second season the quantity of phosphorus in the bath was found to be 0.078% P, thus still paralleling low readings in fresh stable manure. This low reading material was still potent for stimulating plant growth when used in a dilution of 1 to 5000 in water.

The process herein presents a quick and easy way of obtaining the phosphate and other fertilizer value directly from bone, without pressure cooking, and without chemical treatments, thus insuring an economical and effective use of the limited bone supply. It produces a natural, organic source of a complete fertilizer and plant invigorator (containing nitrogen, phosphorus and potassium) with the elements in quickly usable form available for plant synthesis. Furthermore, this fertilizer when placed in compost and leaf heaps will quickly activate the disintegration process.

What I claim as new and desire to cover by Letters Patent is:

1. A plant stimulant produced by the slow decomposition of bone by yeast in the presence of water and a small amount of a water-soluble acid in amount sufficient to maintain the mixture at an acid pH.

2. A plant stimulant composed of water-soluble derivatives separated from and produced by the slow decomposition of bone by yeast in the presence of water and a soluble acid in amount sufficient to maintain the mixture at an optimum acid concentration of substantially pH5.

3. A composition of organic fertilizer matter produced by the direct fermentative action of commercial yeast on bone meal as substantially its sole nutrient, and in an aqueous medium containing a small amount of a water soluble acid sufficient to maintain the said medium at substantially pH5.

4. A composition of matter suitable for use as an organic fertilizer and plant stimulant, comprising the water soluble products of the direct fermentative action of yeast grown on bone meal, as substantially its sole nutrient, dispersed in an aqueous medium, maintained at substantially pH5 by acetic acid.

5. A composition of matter for plant fertilizing and stimulating, comprising the water soluble products of the fermentative digestion of dispersed bone meal by industrial yeast in an aqueous medium, maintained at an optimum pH of substantially 5.0 with a water soluble acid, the bone meal serving as substantially the sole nutrient for the yeast.

6. A composition of organic fertilizer matter comprising the water soluble products of the fermentative action of brewers yeast on bone meal, as substantially its sole nutrient, dispersed in water maintained at an optimum pH of substantially 5.0 by a small amount of a water soluble acid.

7. The method of preparing a water soluble plant growth stimulant, comprising the steps of suspending ground bone and brewers yeast in an aqueous medium having an acid pH to form a culture bath, maintaining the culture bath at room temperature for a sufficient period of time to permit fermentative digestion of the suspended bone by the yeast, the bone forming the sole nutrient for the yeast, adding replacement bone meal and water from time to time, removing aliquot portions of clear liquor from the bath, said liquor containing the water-soluble digestion products of the yeast using the bone meal as its sole nutrient, and diluting the said clear liquor to form a plant growth stimulant.

8. The method of preparing organic fertilizers comprising dispersing bone meal and commercial yeast in an aqueous medium containing a small amount of a water soluble acid sufficient to maintain the said medium at substantially pH5, incubating the resulting suspension at room temperature whereby the bone is fermentatively digested by the yeast, and the resulting water soluble digestion products are separated and used as organic fertilizers.

9. The method of preparing plant growth stimulants comprising dispersing bone meal and yeast in acidified water maintained at substantially pH5 by acetic acid, fermentatively digesting the bone meal by the yeast, the bone meal being the sole nutrient of the yeast, removing aliquot portions of clear solution containing the water-soluble products of the fermentative action of the yeast, and diluting said products to form plant growth stimulants.

MARY ALOYSE ELLINGSON.

REFERENCES CITED

The following references are of record in the file of this patent:

UNITED STATES PATENTS

| Number | Name | Date |
|---|---|---|
| 619,633 | Thompson | Feb. 14, 1899 |
| 947,796 | Coates | Feb. 1, 1910 |
| 2,098,918 | Hendrickson | Nov. 9, 1937 |
| 2,270,518 | Ellis | Jan. 20, 1942 |

FOREIGN PATENTS

| Number | Country | Date |
|---|---|---|
| 20,789 | Great Britain | Oct. 7, 1915 |
| 20,885 | Great Britain | Dec. 1, 1904 |